US010796476B1

United States Patent
Xing et al.

(10) Patent No.: US 10,796,476 B1
(45) Date of Patent: Oct. 6, 2020

(54) SELF-SUPERVISED BOOTSTRAP FOR SINGLE IMAGE 3-D RECONSTRUCTION

(71) Applicant: Amazon Technologies, Inc., Seattle, WA (US)

(72) Inventors: Yifan Xing, Seattle, WA (US); Paulo Mendonca, Seattle, WA (US); Rahul Tewari, Seattle, WA (US)

(73) Assignee: Amazon Technologies, Inc., Seattle ( * ) Notice: Subject to any disclaimer, the term of this patent is extended or adjusted under 35 U.S.C. 154(b) by 26 days.

(21) Appl. No.: 16/119,514

(22) Filed: Aug. 31, 2018

(51) Int. Cl.
*G06T 15/08* (2011.01)
*G06T 15/04* (2011.01)
*G06T 17/20* (2006.01)

(52) U.S. Cl.
CPC .............. *G06T 15/08* (2013.01); *G06T 15/04* (2013.01); *G06T 17/20* (2013.01)

(58) Field of Classification Search
None
See application file for complete search history.

(56) References Cited

U.S. PATENT DOCUMENTS

| 2018/0253895 | A1* | 9/2018 | Arumugam | G06K 9/00208 |
| 2019/0019014 | A1* | 1/2019 | Ye | G06K 9/00228 |
| 2019/0066369 | A1* | 2/2019 | Peng | G06T 15/506 |

OTHER PUBLICATIONS

Bagdanov, A.D., et al.; "The Florence 2D/3D Hybrid Face Dataset," in Proceedings of the 2011 Joint ACM Workshop on Human Gesture and Behavior Understanding, ACM, 2011, pp. 79-80.
Beeler, T., et al.; "High-Quality Passive Facial Performance Capture Using Anchor Frames," in ACM Transactions on Graphics (TOG), ACM, vol. 30, 2011, p. 75.
Blanz, V., et al.; "A Morphable Model for the Synthesis of 3D Faces," in Proceedings of the Annual Conference on Computer Graphics and Interactive Techniques, ACM Press/Addison-Wesley Publishing Co., 1999, pp. 187-194.
Bulat, A., et al.; "How Far Are We From Solving the 2D & 3D Face Alignment Problem? (and a dataset of 230,000 3D facial landmarks)," in Proceedings of the International Conference on Computer Vision (ICCV), vol. 1, 2017, p. 4.
Cao, C., et al.; "FaceWarehouse: A 3D Facial Expression Database for Visual Computing," IEEE Transactions on Visualization and Computer Graphics, vol. 20, No. 3, pp. 413-425, 2014.
Chang, Feng Ju, et al.; "ExpNet: Landmark-Free, Deep, 3D Facial Expressions," in Automatic Face and Gesture Recognition (FG), 2018 13th IEEE International Conference on, 2018, pp. 122-129.
Chen, Xinlei, et al.; "NEIL: Extracting Visual Knowledge From Web Data," in Proceedings of the International Conference on Computer Vision (ICCV), 2013, pp. 1409-1416.

(Continued)

*Primary Examiner* — Frank S Chen
(74) *Attorney, Agent, or Firm* — Nicholson De Vos Webster & Elliott, LLP

(57) ABSTRACT

Techniques for improving a 2D to 3D image reconstruction network machine learning model are described. In some instances, this includes performing at least two transformations of a 3D model to generate at least two rotated 3D models, the at least two transformations to rotate the 3D model about an axis away from a viewing direction of the single 2D image; rendering the at least two rotated 3D models as rendered 2D images; and retraining a 2D to 3D image reconstruction network machine learning model using corresponding pairs of rotated 3D models and rendered 2D images.

20 Claims, 13 Drawing Sheets

(56) References Cited

OTHER PUBLICATIONS

Choy, C.B., et al.; "3D-R2N2: A Unified Approach for Single and Multi-View 3D Object Reconstruction," in Proceedings of the European Conference on Computer Vision (ECCV), Springer, 2016, pp. 628-644.

Huang, G.B., et al.; "Labeled Faces in the Wild: A Database for Studying Face Recognition in Unconstrained Environments," in Workshop on Faces in 'Real-Life' Images: Detection, Alignment, and Recognition, 2008.

Huber, P., et al.; "A Multiresolution 3D Morphable Face Model and Fitting Framework," in Proceedings of the 11th International Joint Conference on Computer Vision, Imaging and Computer Graphics Theory and Applications, 2016.

Jackson, A.S., et al.; "Large Pose 3D Face Reconstruction From a Single Image via Direct Volumetric CNN Regression," in Proceedings of the International Conference on Computer Vision (ICCV), 2017, pp. 1031-1039.

Jiang, L., et al.; "3D Face Reconstruction with Geometry Details from a Single Image," IEEE Transactions on Image Processing, vol. 27, No. 10, pp. 4756-4770, 2018.

Jourabloo, A., et al.; "Large-Pose Face Alignment via CNN-Based Dense 3D Model Fitting," in Proceedings of the Conference on Computer Vision and Pattern Recognition (CVPR), 2016, pp. 4188-4196.

Kemelmacher-Shlizerman, I., et al.; "Face Reconstruction in the Wild," in Proceedings of the International Conference on Computer Vision (ICCV), 2011, pp. 1746-1753.

Kemelmacher-Shlizerman, I.; "Internet Based Morphable Model," in Proceeding of the International Conference on Computer Vision (ICCV), 2013, pp. 3256-3263.

Kim, H., et al.; "InverseFaceNet: Deep Single-Shot Inverse Face Rendering From a Single Image," ArXiv prepring arXiv:1703.10956, 2017.

Kingma, D.P., et al.; "Adam: A Method for Stochastic Optimization," ArXiv preprint arXiv:1412.6980, 2014.

Koestinger, M., et al.; "Annotated Facial Landmarks in the Wild: A Large-Scale, Real-World Database for Facial Landmark Localization," in Proceedings of the International Conference on Computer Vision Workshops, 2011, pp. 2144-2151.

Laine, S., et al.; "Temporal Ensembling for Semi-Supervised Learning," ArXiv preprint arXiv:1610.02242, 2016.

Li L.J., et al.; "Optimol: Automatic On-Line Picture Collection via Incremental Model Learning," Int. Journal of Computer Vision, vol. 88, No. 2, pp. 147-168, 2010.

Li, Z., et al.; "Learning Without Forgetting," IEEE Transactions on Pattern Analysis and Machine Intelligence, 2017.

Lorensen, W.E, et al.; "Marching Cubes: A High Resolution 3D Surface Construction Algorithm," SIGGRAPH Comput. Graph., vol. 21, No. 4, pp. 163-169, Aug. 1987, ISSN: 0097-8930.

Piotraschke, M., et al.; "Automated 3D Face Reconstruction From Multiple Images Using Quality Measures," in Proceedings of the Conference on Computer Vision and Pattern Recognition (CVPR), 2016, pp. 3418-3427.

Radosavovic, I., et al.; "Data Distillation: Towards Omni-Supervised Learning," ArXiv preprint arXiv:1610.02242, 2016.

Richardson, E., et al.; "3D Face Reconstruction by Learning From Synthetic Data," in 3D Vision (3DV), 2016 Fourth International Conference on, 2016, pp. 460-469.

Richardson, E., et al.; "Learning Detailed Face Reconstruction from a Single Image," in Proceedings of the Conference on Computer Vision and Pattern Recognition (CVPR), 2017, pp. 5553-5562.

Romdhani, S., et al.; "Efficient, Robust and Accurate Fitting of a 3D Morphable Model," in Proceedings of the International Conference on Computer Vision (ICCV), vol. 3, 2003, pp. 59-66.

Romdhani, S., et al.; "Estimating 3D Shape and Texture Using Pixel Intensity, Edges, Specular Highlights, Texture Constraints and a Prior," in Proceedings of the Conference on Computer Vision and Pattern Recognition (CVPR), vol. 2, 2005, pp. 986-993.

Rosenberg, C., et al.; "Semi-Supervised Self-Training of Object Detection Models," in WACV/Motion, 2005, pp. 29-36.

Roth, J., et al.; "Adaptive 3D Face Reconstruction From Unconstrained Photo Collections," in Proceedings of the Conference on Computer Vision and Pattern Recognition (CVPR), 2016, pp. 4197-4206.

Sagonas, C., et al.; "300 Faces in-the-Wild Challenge: The First Facial Landmark Localization Challenge," in Proceedings of the International Conference on Computer Vision Workshops, 2013, pp. 397-403.

Savran, A., et al.; "Bosphorus Database for 3D Face Analysis," in European Workshop on Biometrics and Identity Management, Springer, 2008, pp. 47-56.

Suwajanakorn, S., et al.; "Total Moving Face Reconstruction," in Proceedings of the European Conference on Computer Vision (ECCV), Springer, 2014, pp. 796-812.

Tewari, A., et al.; "Mofa: Model-Based Deep Convolutional Face Autoencoder for Unsupervised Monocular Reconstruction," in the IEEE International Conference on Computer Vision (ICCV), vol. 2, 2017, p. 5.

Tewari, A., et al.; "Self-Supervised Multi-Level Face Model Learning for Monocular Reconstruction at over 250 hz," ArXiv preprint arXiv:1712.02859, vol. 2, 2017.

Thies, J., et al.; "Face2Face: Real-Time Face Capture and Reenactment of rgb Videos," in Proceedings of the Conference on Computer Vision and Pattern Recognition (CVPR), 2016, pp. 2387-2395.

Tran, A.T., et al.; "Regressing Robust and Discriminative 3D Morphable Models with a Very Deep Neural Network," in Proceedings of the Conference on Computer Vision and Pattern Recognition (CVPR), 2017, pp. 1493-1502.

Valgaerts, L, et al.; "Lightweight Binocular Facial Performance Capture Under Uncontrolled Lighting," ACM Trans. Graph., vol. 31, No. 6, pp. 187-1, 2012.

Zhang X. et al.; "A High-Resolution Spontaneous 3D Dynamic Facial Expression Database," in Automatic Face and Gesture Recognition (FG), 2013 10th IEEE International Conference and Workshops on, 2013, pp. 1-6.

Zhu, X. et al.; "Face Alignment Across Large Poses: A 3D Solution," in Proceedings of the Conference on Computer Vision and Pattern Recognition (CVPR), 2016, pp. 146-155.

* cited by examiner

SELF-SUPERVISED BOOTSTRAP FOR SINGLE IMAGE 3-D RECONSTRUCTION

BACKGROUND

A broad category of face-reconstruction methods uses parametric models for representing the 3D shape of the faces. 3D Morphable Model (3DMM) deploys an affine parametric model for face geometry, expression, and reflectance. With 3DMM, the face geometry is reduced to a low-dimensional subspace obtained from the principal components of a set of high-resolution facial scans.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for self-supervised single-image 3D reconstruction are described.

Despite their widespread use, 3DMM approaches suffer from the fact that they limit the reconstructed 3D geometry to a low-dimensional subspace, which restricts the diversity of reconstructed shapes. State-of-the-art methods for 3D reconstruction of faces from a single image, such as 3DMM, require 2D-3D pairs of ground-truth data for supervision. These pairs are costly to acquire, and most datasets available in the literature are restricted to pairs for which the input 2D images depict faces in a near fronto-parallel pose. Therefore, the majority of data-driven methods for single-image 3D facial reconstruction perform poorly on profile and near-profile faces.

Detailed herein are embodiments that improve the performance of a single-image 3D reconstruction network by utilizing the network to synthesize its own training data for fine-tuning. In particular, a self-supervised bootstrap approach that increases the performance of a pre-trained network towards profile views without the need of any additional ground-truth 3D shape information is described.

In some embodiments, a single-image 3D reconstruction (such as of faces of near frontal images) is performed without a ground-truth 3D shape to generate a reconstructed 3D image model; an application of a rigid-body transformation to the reconstructed 3D image model; the reconstructed 3D image model is then rendered from different viewpoints into a plurality of 2D images (one 2D image per viewpoint); and the rendered images and corresponding 3D reconstruction are used as additional data for supervised fine-tuning of the single-image 3D reconstruction network. The new 2D-3D pairs that are produced have the same high-quality observed for near fronto-parallel reconstructions, thereby nudging the network towards more uniform performance as a function of the viewing angle of input faces. Application of the proposed techniques to the fine-tuning of a state-of-the-art single-image 3D reconstruction network for faces demonstrates an improvement to the overall performance of the network, with particularly significant gains for profile or near-profile views.

As such, a technical contribution of the embodiments detailed herein is self-supervised approach that improves performance of a deep-learning model for single-image 3D reconstruction (for example, on profile and near-profile views) without the requirement of additional external training data, leading to better robustness to viewpoint variations on input images. Another technical contribution of the embodiments is that the generated new pairs of a 2D image to a 3D model through the self-supervised bootstrap process can be also useful as additional training data for other vision tasks such as general face detection and recognition.

Figure 1:
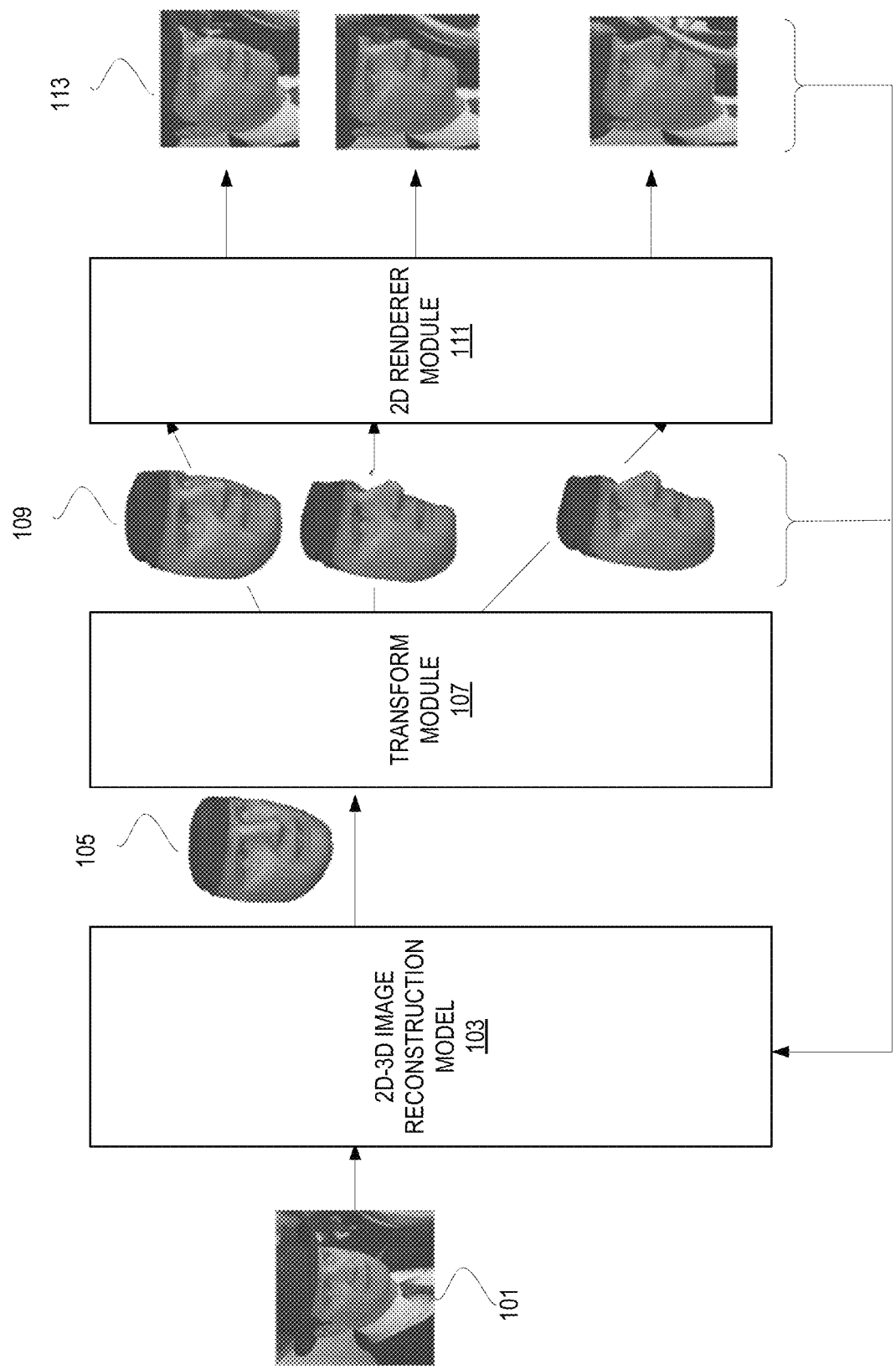
FIG. 1 illustrates embodiments of self-supervised single-image 3D reconstruction.

FIG. 1 illustrates embodiments of self-supervised single-image 3D reconstruction. A single 2D image 101 is input into a 2D-3D image reconstruction model 103 which generates a 3D model 105. Typically, the 3D model 105 includes a mesh (such as geometry information) and a texture map. The 3D model 105 may also include illumination and/or expression information.

In some embodiments, the 2D-3D image reconstruction model 103 is a volumetric regression network (VRN). However, other data-driven single image 3D reconstruction networks may be used. VRN egresses an occupancy volume, in 3D, from a single 2D input image. The occupancy volume is then converted into a mesh by the marching-cubes algorithm. However, other reconstruction models are used in some embodiments as 3DMM.

The 3D model 105 is then subjected to a transformation by a transform module 207 to rotate the 3D model 105 in different angles away from the perspective of a camera to generate a plurality of rotated 3D models 109. In some embodiments, a rigid body transformation is performed. Further, in some embodiments, when a reconstructed 3D model 105 is a fronto-parallel view and rigid body transformation is used, the volume of the 3D model 15 is steered toward profile or near-profile views, where a given pre-trained network may not perform as well. To control the pose of the new (novel) viewpoints, what is the current pose of the object (such as a face) with respect to the camera should understood. An approach is to represent the current object's pose by describing its plane of bilateral symmetry, and its "backplane," which is a plane orthogonal to both the object's plane of symmetry and the direction pointed at by the object (such as the direction pointed to by a person's nose). Estimation of the bilateral symmetry plane can be achieved by observing that the plane normal is an eigenvector of the sample covariance matrix of the vertices in a mesh representation of the face. Moreover, due to the nature of the VRN reconstruction, which produces "shallow" faces, akin to a face mask rather than a full skull, the other two eigenvectors of the sample covariance matrix correspond to the direction and the "vertical" direction of the face, pointing towards the top of the object.

In some embodiments, novel viewpoints are made by rotating the model around axes y (tilt) and x (pitch) by increments of 10 degrees. The 3D model is rotated away from the bilateral symmetry plane, up to the maximal angle such that the gaze direction does not exceed 90 degrees with respect to the camera viewing direction. Finally, the rotation angle may be constrained around x (pitch) to the interval [−20 degrees, 20 degrees].

In some embodiments, the rotated 3D models 109 are subjected to further processing such as changing a facial expression, etc. by applying one or more filters on the mesh.

The 3D models 109 (or further processed 3D models) are then subjected to 2D rendering by a 2D renderer module 111 to generate corresponding 2D images 113. In some embodiments, an emissive illumination model is used by the 2D renderer module 11, where the material of each vertex has no reflectance component and behaves instead as a light source. In some embodiments, additional changes may be made to the rotated 3D models 109 (or further processed 3D models) such as changing the illumination (position of light) during the 2D rendering.

Pairs of rotated 3D models 109 and corresponding 2D images 113 are then used to retrain the 2D-3D image reconstruction model 103. These pairs serve as additional data to fine-tune the original 2D-3D image reconstruction model 103 for image reconstruction. There is no additional change to the original 2D-3D image reconstruction model 103 or loss function. As there is no requirement to gather 3D ground-truth for the self-supervised bootstrap procedure, any in-the-wild 2D face images may be used to improve the given pretrained 2D-3D image reconstruction model 103.

Aspects for which the 2D-3D image reconstruction model 103 performs poorly can be identified by comparison between two 3D models: a higher-quality model obtained by applying transformation to the 3D model obtained from an input image, and the 3D model obtained from the reconstruction of the rendering of the transformed models.

Figure 2:
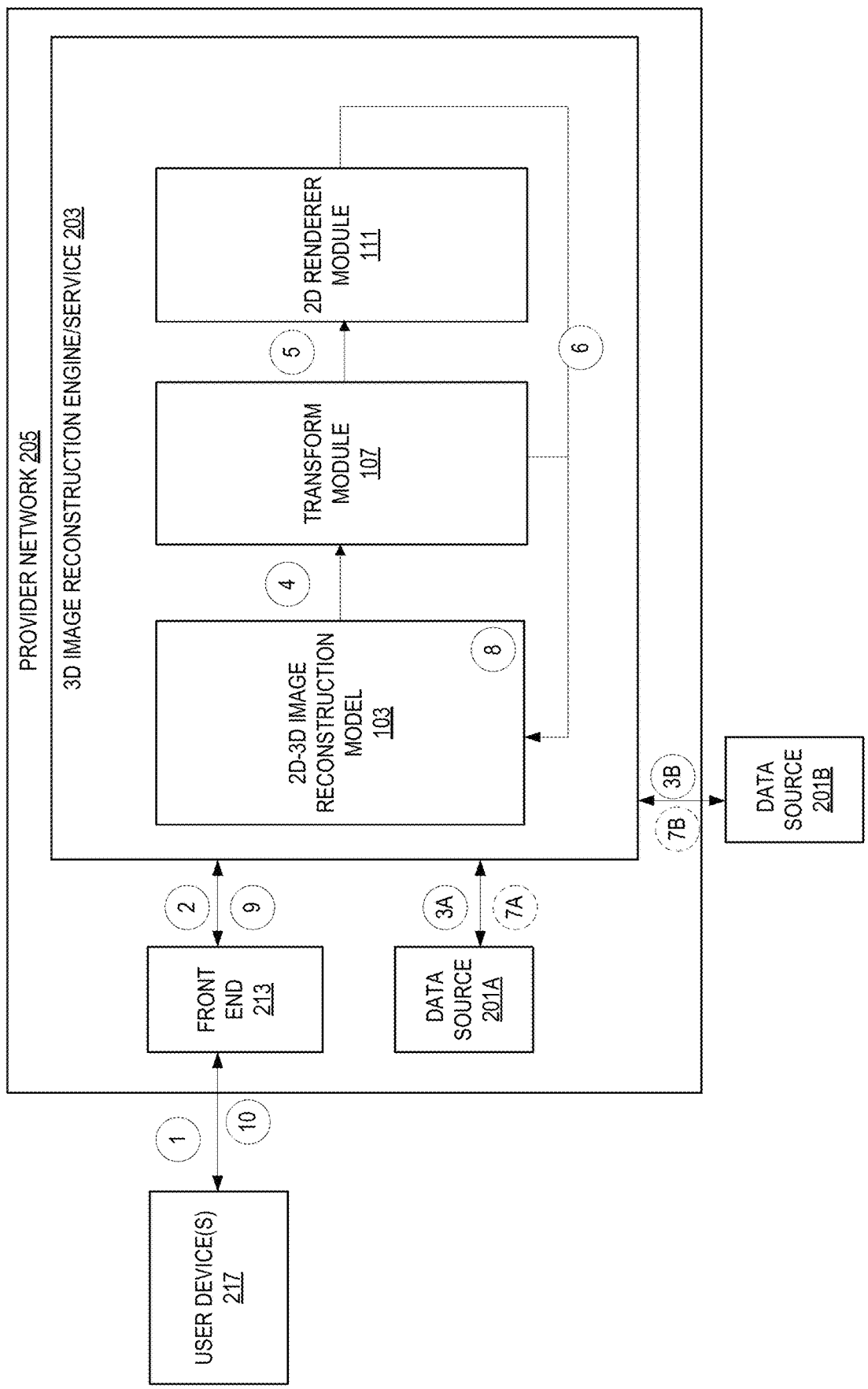
FIG. 2 illustrates embodiments of a system for 3D image reconstruction as a service of a provider network.

FIG. 2 illustrates embodiments of a system for 3D image reconstruction as a service of a provider network. In this illustration, a 3D image reconstruction engine/service 203 of the provider network 205 (such as a web services provider) includes several of the illustrated components have been described with respect to FIG. 1. These components operate as detailed earlier. The 3D image reconstruction engine/service 203 may executed on bare metal, by a virtual machine, or as a container. In some embodiments, the 3D image reconstruction engine/service 203 is stored as code to be executed by a processor such as a central processing unit or an accelerator.

A data source 201A or 201B provides a 2D image to be reconstructed by the 2D-3D image reconstruction model 103. In other embodiments, the data source 201A or 201B is a storage location such as a database in a hosted processing environment, or a database accessible to a hosted processing environment. Examples of a data source 201A or 201B include, but are not limited to: a part of a server (e.g., a virtual network of devices within a web services provider), one or more edge devices (e.g., a phone, camera, sensors, etc.), an aggregation of data sources (such as an aggregation of edge devices), etc. The data source 201A or 201B may also store the resulting pairs to be used in training the 2D-3D image reconstruction model 103 or another 2D-3D image reconstruction model.

A front end 213 is used to configure the 3D image reconstruction engine/service 203 using a user device 217. The user device or devices 217 utilizes a 3D image reconstruction engine/service 203 to call the 3D image reconstruction engine/service 203 in some embodiments.

In most embodiments, the front end 213 and the 3D image reconstruction engine/service 203 are software executing on one or more processors. For example, in some embodiments, this software is a part of a web services offering. Additionally, while the 3D image reconstruction engine/service 203 is shown as comprising separate components, in some embodiments, one or more of these components are combined.

FIG. 2 illustrates circles with numbers in them to denote actions. At circle 1, in some embodiments, a user device 217 provides a request for the 3D image reconstruction engine/service 203 via the front end 213. For example, a request is generated via a user device 217 to configure the 3D image reconstruction engine/service 203 to operate in a particular manner. A request may include one or more of: an identifier of a data source (such as a database location or an identifier of a 2D image); an identifier of which techniques to utilize for: 2D-3D image reconstruction (which model to use), transformation, and rendering; a 2D image; and/or an indication of how an output is to be presented. In some embodiments, the identifier of which techniques to utilize comes in the form of a selection of one or more configurable algorithms. For example, a configuration may indicate to use a particular reconstruction model, wherein the 3D image reconstruction engine/service 203 includes, or has access to, code to enable this functionality. In some embodiments, an identification of where to find code to perform these techniques is provided. In some embodiments, the code itself is provided as a part of the request.

At circle 2, in some embodiments, the 3D image reconstruction engine/service 203 is configured as requested via the front end 213. In this example, the 3D image reconstruction engine/service 203 is also set to run.

The data source(s) 201A or 201B provide a 2D image at circle 3A or 3B to the 3D image reconstruction engine/service 203.

At circle 4, the 2D-3D image reconstruction model 103 generates and outputs a 3D model from the received 2D image. The resultant 3D model is passed to the transform module 107 for rotation to generate and output a plurality of rotated 3D models at circle 5. The plurality of rotated 3D models are then rendered as 2D images by the 2D renderer module 111 and the rendered 2D images and corresponding rotated 3D models are passed to the 2D-3D image reconstruction model 103 at circle 6. In some embodiments, these pairs are stored in data source 201A and 201B at circles 7A and 7B.

The 2D-3D image reconstruction model 103 is retrained at circle 8. An indication of retraining is sent back to the user device via the front end 213 at circles 9 and 10.

Figure 3:
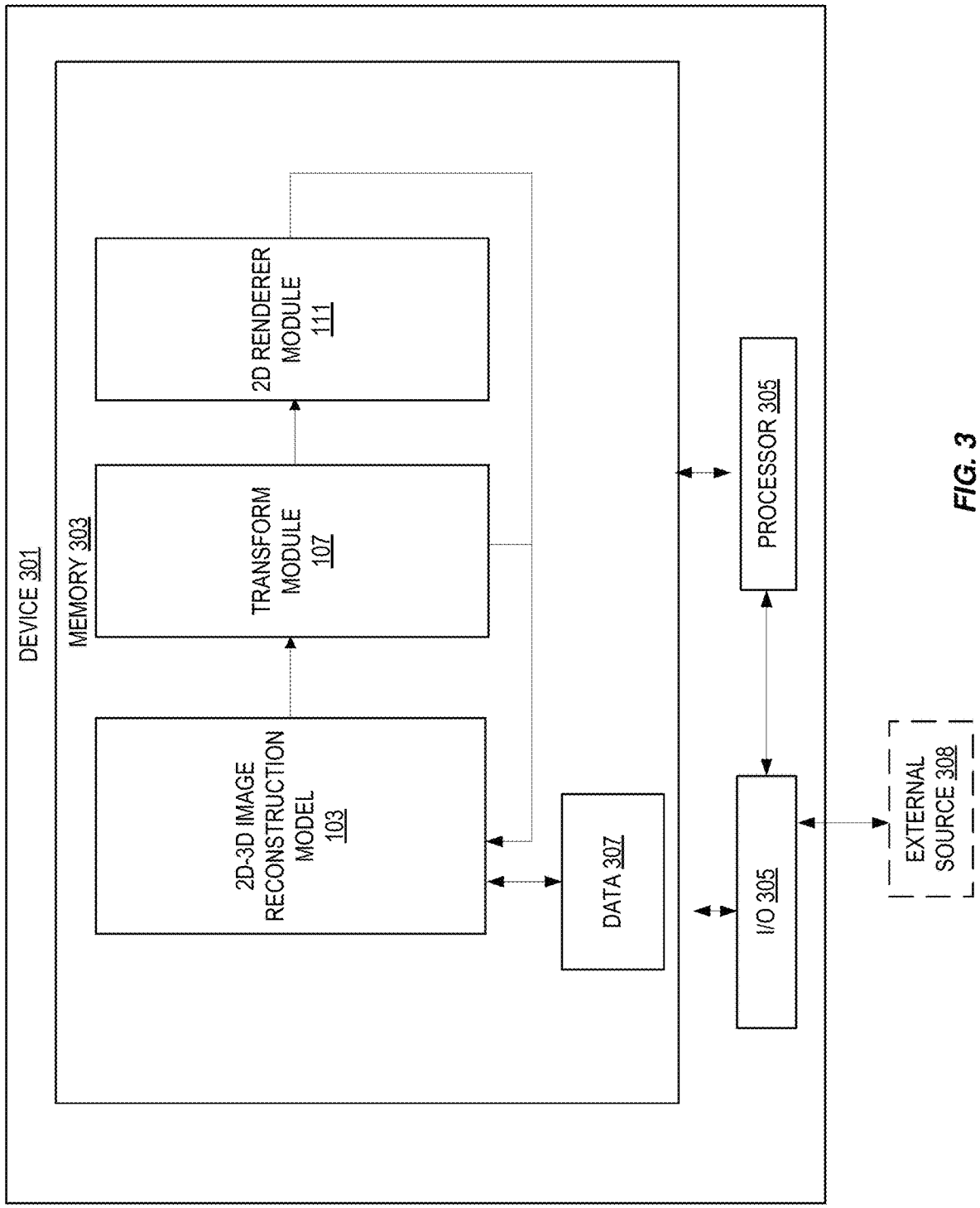
FIG. 3 illustrates embodiments of a device for 3D image reconstruction.

FIG. 3 illustrates embodiments of a device for 3D image reconstruction. The device 301 includes memory 303 to store the components detailed above for 3D image reconstruction engine/service 203 and also to store the data 307 to operate on.

The memory 303 is coupled to a processor 305 which executes the components 204-212. The memory 303 is also coupled to input/output mechanisms 305 (such as an interconnect for a keyboard, mouse, display) either directly or via the processor 305.

In some embodiments, an external data source 307 provides the dataset. In other embodiments, the dataset is generated internally by other code 309.

Figure 4:
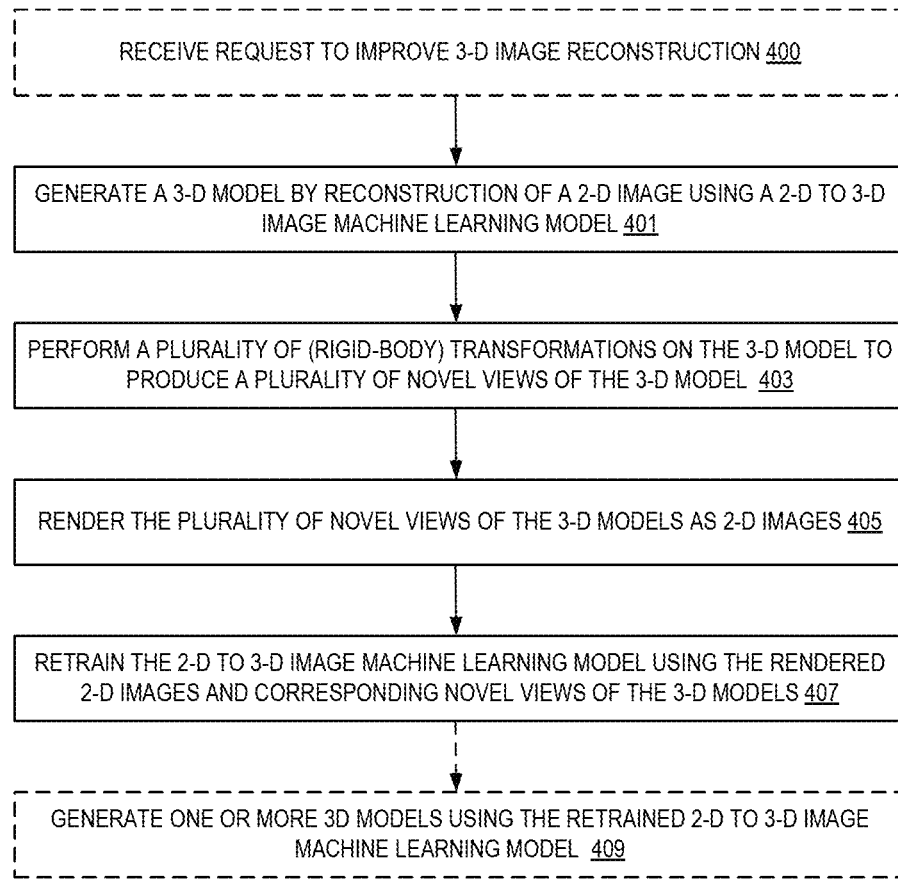
FIG. 4 illustrates embodiments of a method for self-supervised single-image 3D reconstruction.

FIG. 4 illustrates embodiments of a method for self-supervised single-image 3D reconstruction. In particular, embodiments of this method are performed by a 3D image reconstruction engine/service, or within a device having components similar to that of a 3D image reconstruction engine/service.

In some embodiments, at 400, a request to improve 3D model reconstruction in a self-supervised manner is received. For example, in a provider network, a request to improve 3D image reconstruction s is received via a front end. The request includes parameters to be applied by a 3D image reconstruction engine/service, or device. Examples of such parameters have been detailed above.

A 3D model is generated by reconstruction of a 2D image using a 2D to 3D image model at 401. An example of such reconstruction and model 103 have been detailed.

A plurality of transformations on the generated 3D model are performed at 403 to produce a plurality of novel views of the 3D model. In some embodiments, this is performed by transform module 107. Examples of transformations have been detailed.

A plurality of 2D images are rendered based on the plurality of novel views of the 3D model at 405. In some embodiments, this is performed by 2D renderer module 111. Examples of rendering have been detailed. In some embodiments, in order to produce more realistic renderings a background is added. The original image may be used as the background, textured mapped onto the backplane.

At 407, the 2D to 3D image model is retrained using the rendered 2D images and corresponding novel views of the 3D model.

In some embodiments, one or more 3D models are generated using the retrained 2D to 3D image model at 409. Each of these models being generated from a single 2D image.

Figure 5:
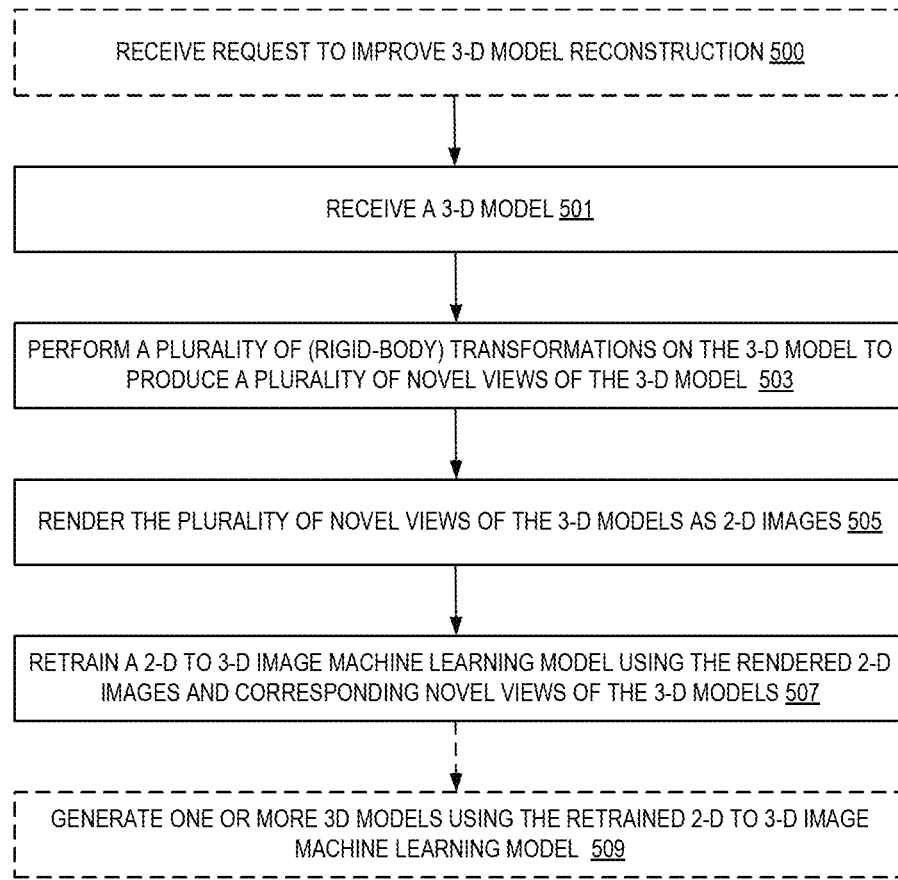
FIG. 5 illustrates embodiments of a method for self-supervised single-image 3D reconstruction.

FIG. 5 illustrates embodiments of a method for self-supervised single-image 3D reconstruction. In particular, embodiments of this method are performed by a 3D image reconstruction engine/service, or within a device having components similar to that of a 3D image reconstruction engine/service.

In some embodiments, at 500, a request to improve 3D model reconstruction in a self-supervised manner is received. For example, in a provider network, a request to improve 3D image reconstruction s is received via a front end. The request includes parameters to be applied by a 3D image reconstruction engine/service, or device. Examples of such parameters have been detailed above.

A 3D model is received at 501.

A plurality of transformations on the received 3D model are performed at 503 to produce a plurality of novel views of the 3D model. In some embodiments, this is performed by transform module 107. Examples of transformations have been detailed.

A plurality of 2D images are rendered based on the plurality of novel views of the 3D model at 505. In some embodiments, this is performed by 2D renderer module 111. Examples of rendering have been detailed. In some embodiments, in order to produce more realistic renderings a background is added. The original image may be used as the background, textured mapped onto the backplane.

At 507, a 2D to 3D image model is retrained using the rendered 2D images and corresponding novel views of the 3D model.

In some embodiments, one or more 3D models are generated using the retrained 2D to 3D image model at 509. Each of these models being generated from a single 2D image.

Figure 6:
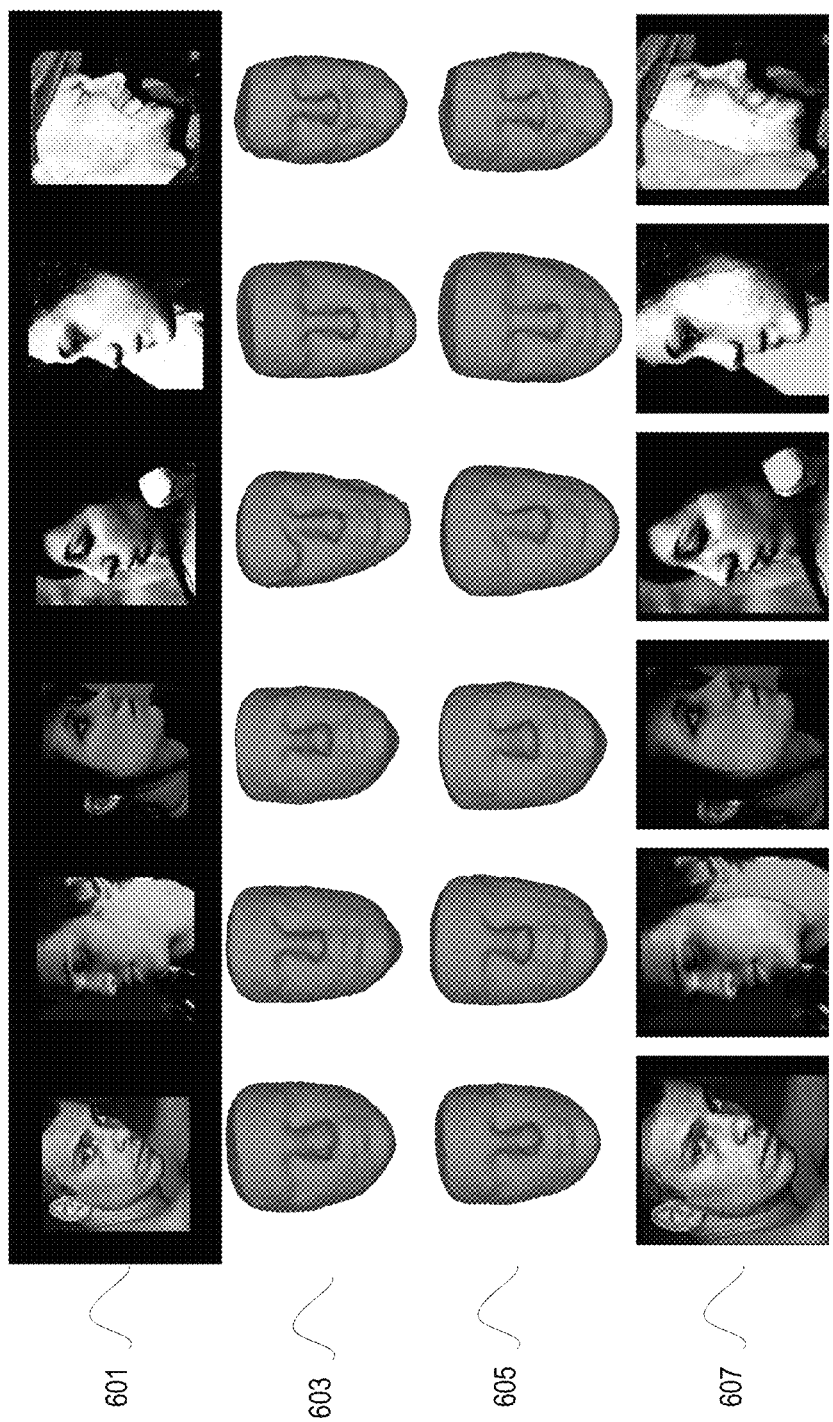
FIG. 6 illustrates qualitative results of using self-supervised single-image 3D reconstruction.

FIG. 6 illustrates qualitative results of using self-supervised single-image 3D reconstruction. Original 2D images are shown in row 601. 3D models developed without self-supervised single-image 3D reconstruction appear in row 603. Row 605 shows 3D models reconstructed after retraining the model as detailed above. In rows 603 and 605, the model is rotated to a frontal viewpoint. Finally, row 607 shows the 2D image overlaid with the texture-mapped reconstructed model of row 605.

As noted, embodiments detailed here, may use any existing method for single-image 3D face reconstruction and the 3D models produced by such methods and their renderings at different viewpoints as data to fine-tune the original model. There is no requirement of either additional 2D-3D ground-truth pairs, nor an additional deep-learning model for training. Thus, the proposed bootstrap procedure is self-contained and works from any near-frontal face images, without annotations or 3D ground truth.

Figure 7:
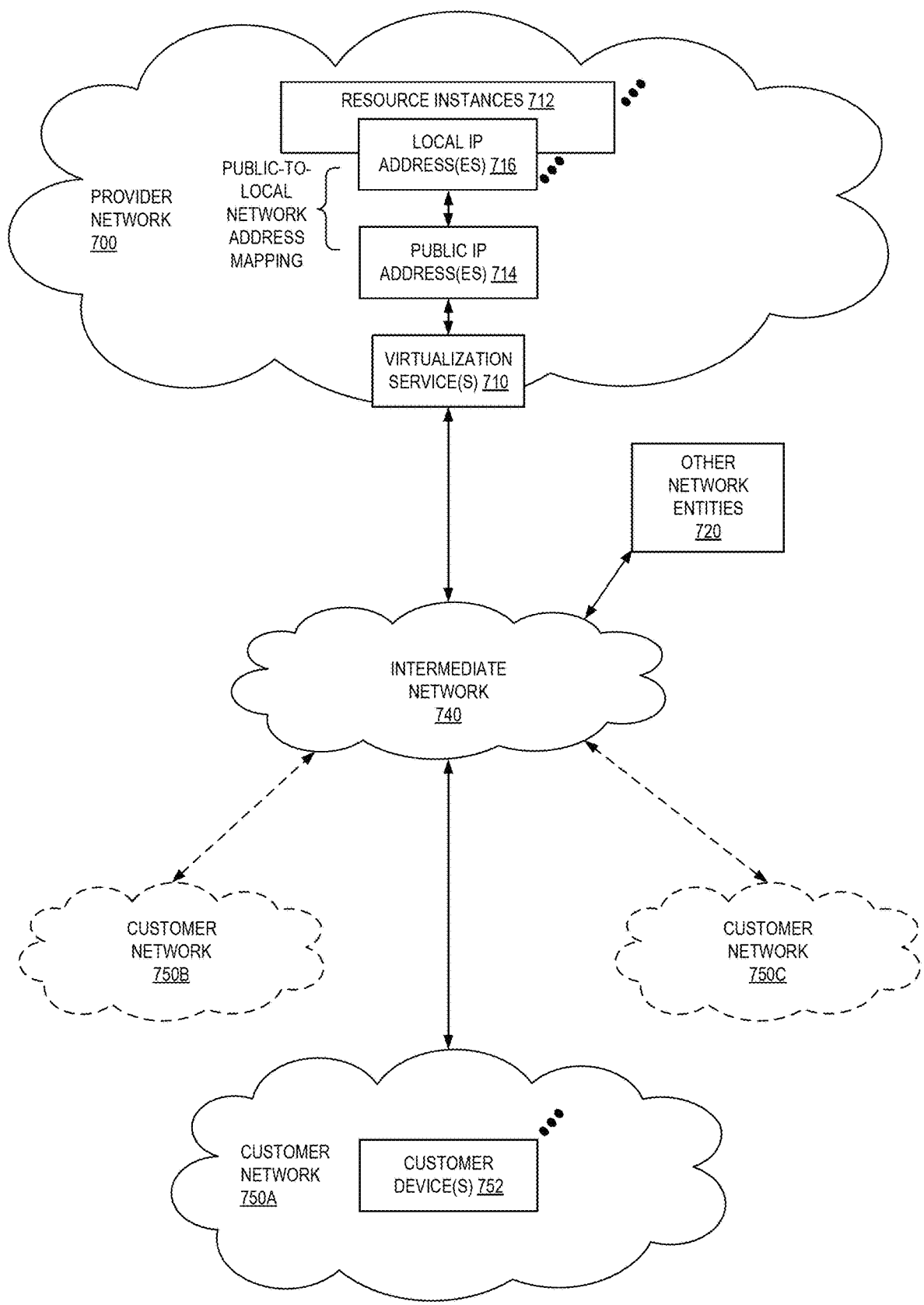
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
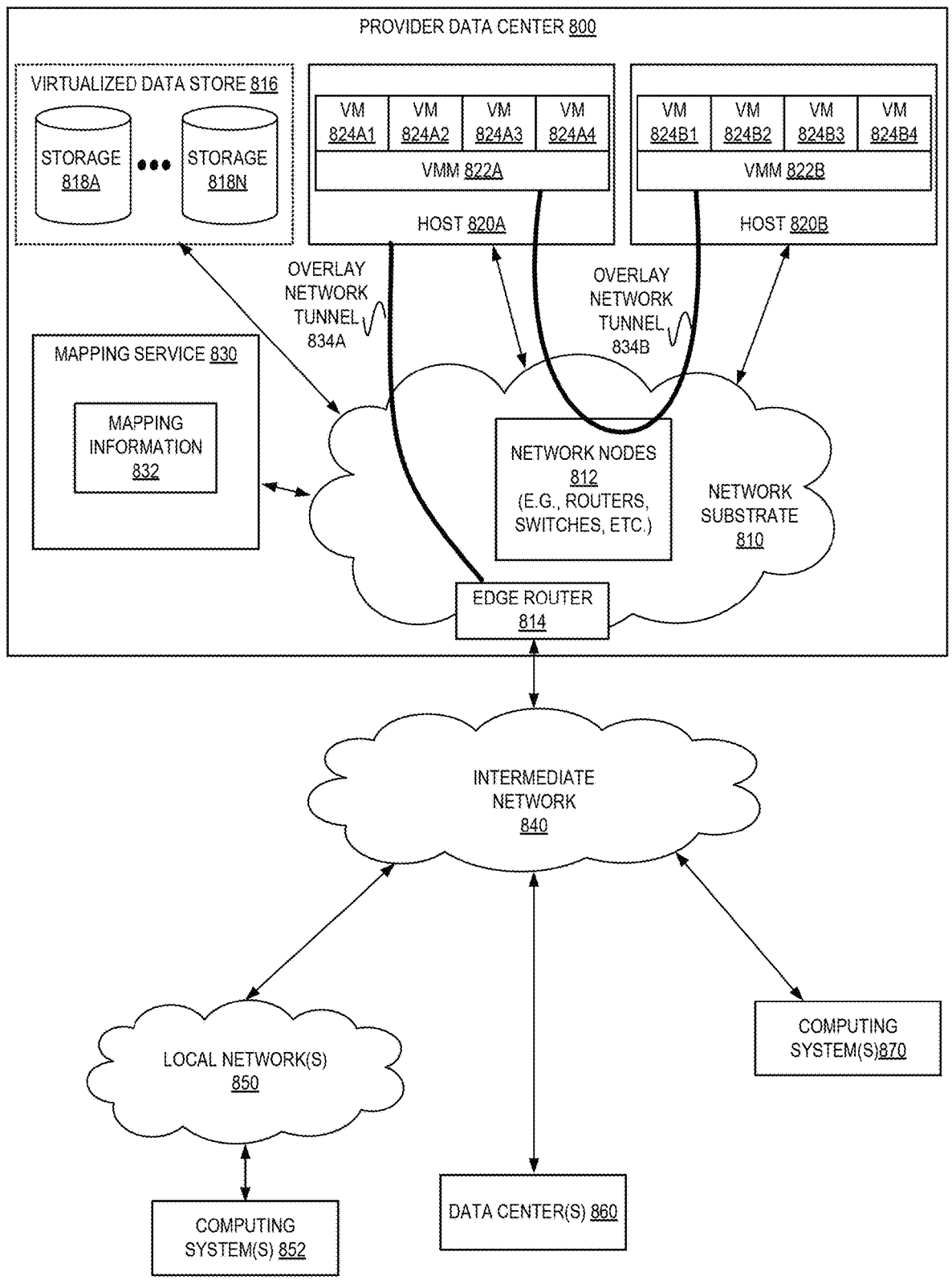
FIG. 8 illustrates an example data center that implements an overlay network on a network substrate using IP tunneling technology according to some embodiments.

FIG. 8 illustrates an example data center that implements an overlay network on a network substrate using IP tunneling technology, according to some embodiments. A provider data center 800 may include a network substrate that includes networking nodes 812 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 810 using tunnels. The IP tunneling technology may provide a mapping and encapsulating system for creating an overlay network on a network (e.g., a local network in data center 800 of FIG. 8) and may provide a separate namespace for the overlay layer (the public IP addresses) and the network substrate 810 layer (the local IP addresses). Packets in the overlay layer may be checked against a mapping directory (e.g., provided by mapping service 830) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 830) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 8, an example overlay network tunnel 834A from a virtual machine (VM) 824A (of VMs 824A1-824A4, via VMM 822A) on host 820A to a device on the intermediate network 850 and an example overlay network tunnel 834B between a VM 824A (of VMs 824A1-824A4, via VMM 822A) on host 820A and a VM 824B (of VMs 824B1-824B4, via VMM 822B) on host 820B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 8, at least some networks in which embodiments may be implemented may include hardware virtualization technology that enables multiple operating systems to run concurrently on a host computer (e.g., hosts 820A and 820B of FIG. 8), i.e. as virtual machines (VMs) 824 on the hosts 820. The VMs 824 may, for example, be executed in slots on the hosts 820 that are rented or leased to customers of a network provider. A hypervisor, or virtual machine monitor (VMM) 822, on a host 820 presents the VMs 824 on the host with a virtual platform and monitors the execution of the VMs 824. Each VM 824 may be provided with one or more local IP addresses; the VMM 822 on a host 820 may be aware of the local IP addresses of the VMs 824 on the host. A mapping service 830 may be aware of (e.g., via stored mapping information 832) network IP prefixes and IP addresses of routers or other devices serving IP addresses on the local network. This includes the IP addresses of the VMMs 822 serving multiple VMs 824. The mapping service 830 may be centralized, for example on a server system, or alternatively may be distributed among two or more server systems or other devices on the network. A network may, for example, use the mapping service technology and IP tunneling technology to, for example, route data packets between VMs 824 on different hosts 820 within the data center 800 network; note that an interior gateway protocol (IGP) may be used to exchange routing information within such a local network.

In addition, a network such as the provider data center 800 network (which is sometimes referred to as an autonomous system (AS)) may use the mapping service technology, IP tunneling technology, and routing service technology to route packets from the VMs 824 to Internet destinations, and from Internet sources to the VMs 824. Note that an external gateway protocol (EGP) or border gateway protocol (BGP) is typically used for Internet routing between sources and destinations on the Internet. FIG. 8 shows an example provider data center 800 implementing a network that provides resource virtualization technology and that provides full Internet access via edge router(s) 814 that connect to Internet transit providers, according to some embodiments. The provider data center 800 may, for example, provide customers the ability to implement virtual computing systems (VMs 824) via a hardware virtualization service and the ability to implement virtualized data stores 816 on storage resources 818A-818N via a storage service.

The data center 800 network may implement IP tunneling technology, mapping service technology, and a routing service technology to route traffic to and from virtualized resources, for example to route packets from the VMs 824 on hosts 820 in data center 800 to Internet destinations, and from Internet sources to the VMs 824. Internet sources and destinations may, for example, include computing systems 870 connected to the intermediate network 840 and computing systems 852 connected to local networks 850 that connect to the intermediate network 840 (e.g., via edge router(s) 814 that connect the network 850 to Internet transit providers). The provider data center 800 network may also route packets between resources in data center 800, for example from a VM 824 on a host 820 in data center 800 to other VMs 824 on the same host or on other hosts 820 in data center 800.

A service provider that provides data center 800 may also provide additional data center(s) 860 that include hardware virtualization technology similar to data center 800 and that may also be connected to intermediate network 840. Packets may be forwarded from data center 800 to other data centers 860, for example from a VM 824 on a host 820 in data center 800 to another VM on another host in another, similar data center 860, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 818A-818N, as virtualized resources to customers of a network provider in a similar manner.

Figure 9:
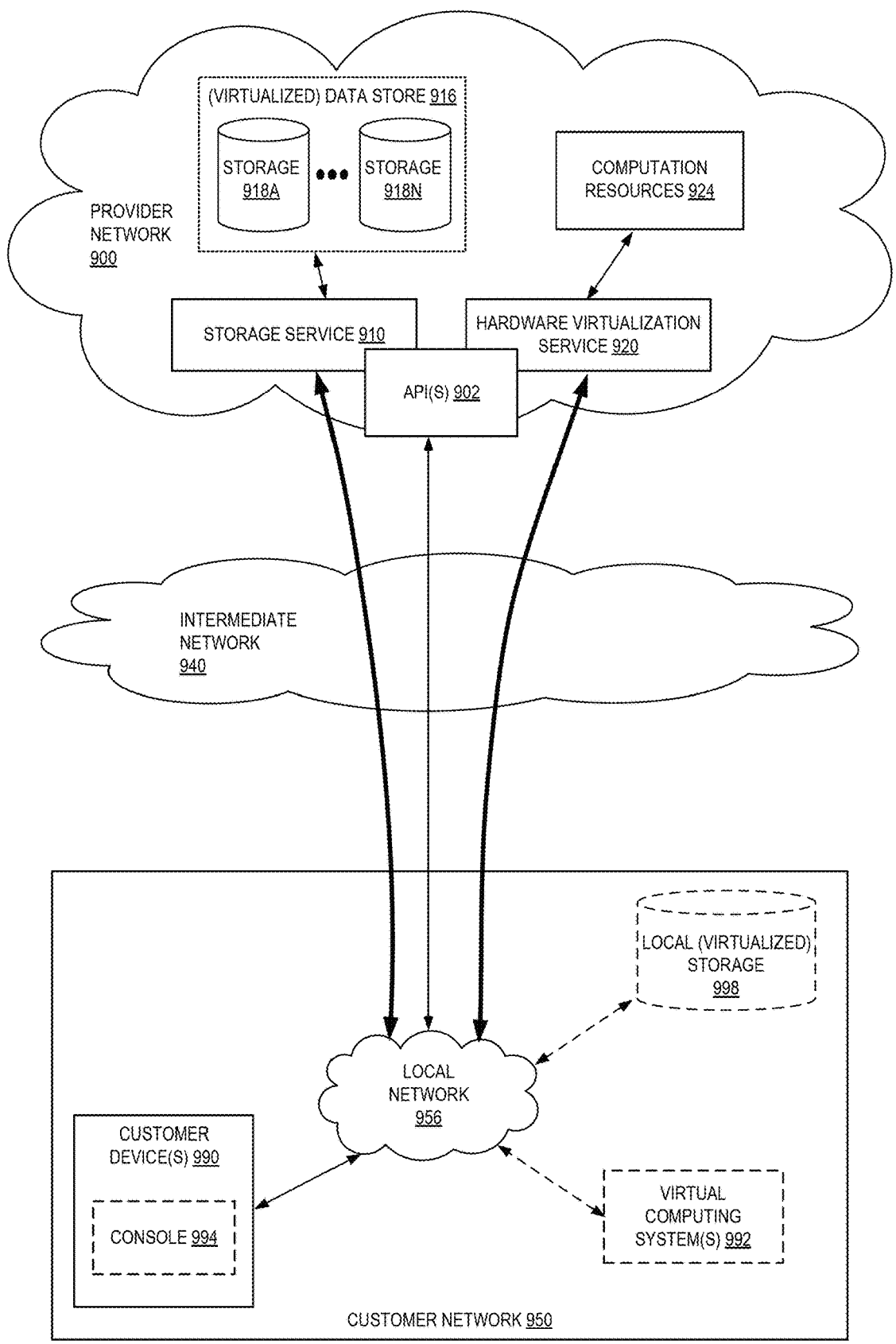
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
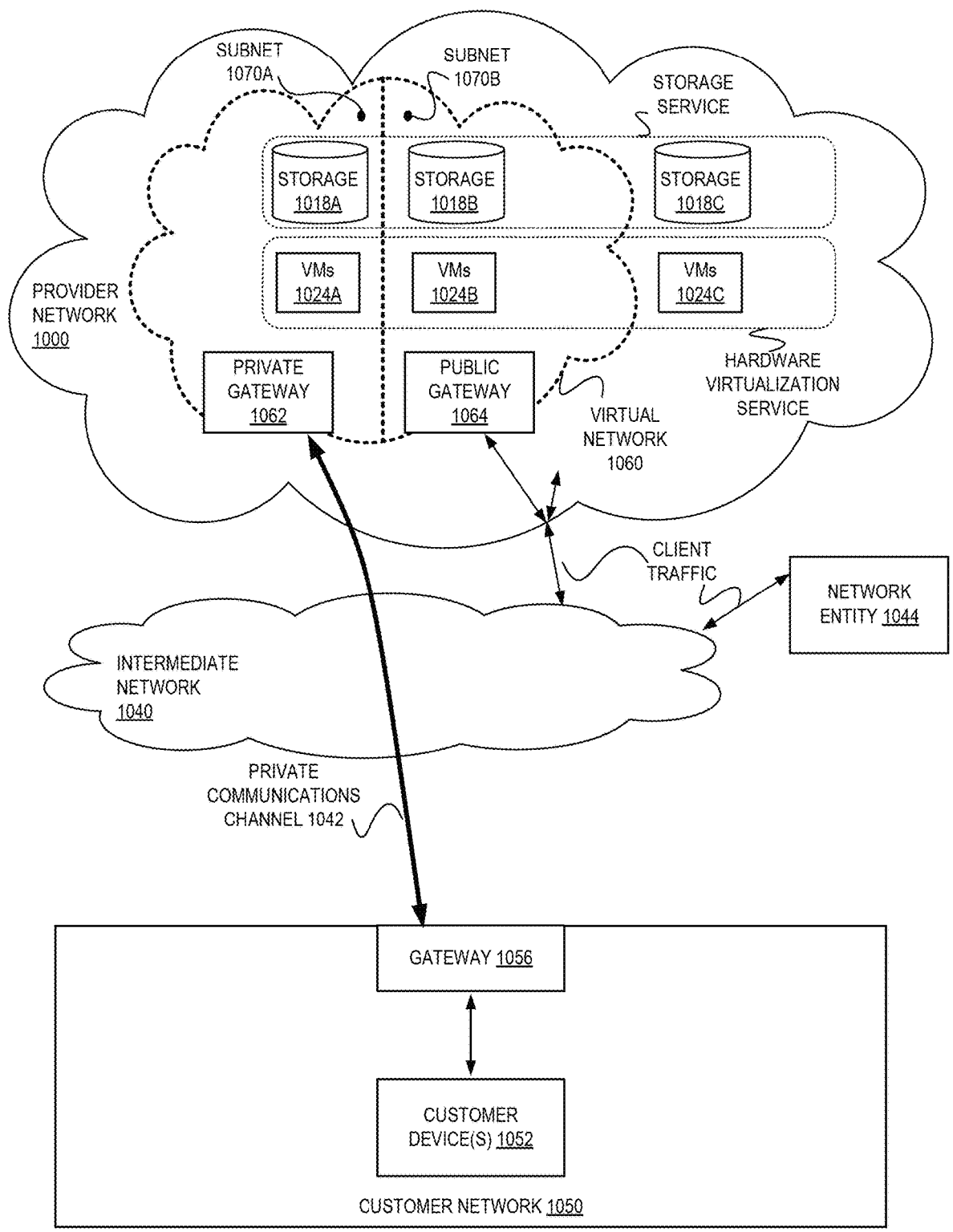
FIG. 10 illustrates an example provider network that provides virtual networks on the provider network to at least some customers according to some embodiments.

FIG. 10 illustrates an example provider network that provides virtual networks on the provider network to at least some customers, according to some embodiments. A customer's virtual network 1060 on a provider network 1000, for example, enables a customer to connect their existing infrastructure (e.g., one or more customer devices 1052) on customer network 1050 to a set of logically isolated resource instances (e.g., VMs 1024A and 1024B and storage 1018A and 1018B), and to extend management capabilities such as security services, firewalls, and intrusion detection systems to include their resource instances.

A customer's virtual network 1060 may be connected to a customer network 1050 via a private communications channel 1042. A private communications channel 1042 may, for example, be a tunnel implemented according to a network tunneling technology or some other technology over an intermediate network 1040. The intermediate network may, for example, be a shared network or a public network such as the Internet. Alternatively, a private communications channel 1042 may be implemented over a direct, dedicated connection between virtual network 1060 and customer network 1050.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1060 for a customer on provider network 1000, one or more resource instances (e.g., VMs 1024A and 1024B and storage 1018A and 1018B) may be allocated to the virtual network 1060. Note that other resource instances (e.g., storage 1018C and VMs 1024C) may remain available on the provider network 1000 for other customer usage. A range of public IP addresses may also be allocated to the virtual network 1060. In addition, one or more networking nodes (e.g., routers, switches, etc.) of the provider network 1000 may be allocated to the virtual network 1060. A private communications channel 1042 may be established between a private gateway 1062 at virtual network 1060 and a gateway 1056 at customer network 1050.

In some embodiments, in addition to, or instead of, a private gateway 1062, virtual network 1060 may include a public gateway 1064 that enables resources within virtual network 1060 to communicate directly with entities (e.g., network entity 1044) via intermediate network 1040, and vice versa, instead of or in addition to via private communications channel 1042.

Virtual network 1060 may be, but is not necessarily, subdivided into two or more subnetworks, or subnets, 1070. For example, in implementations that include both a private gateway 1062 and a public gateway 1064, a virtual network 1060 may be subdivided into a subnet 1070A that includes resources (VMs 1024A and storage 1018A, in this example) reachable through private gateway 1062, and a subnet 1070B that includes resources (VMs 1024B and storage 1018B, in this example) reachable through public gateway 1064.

The customer may assign particular customer public IP addresses to particular resource instances in virtual network 1060. A network entity 1044 on intermediate network 1040 may then send traffic to a public IP address published by the customer; the traffic is routed, by the provider network 1000, to the associated resource instance. Return traffic from the resource instance is routed, by the provider network 1000, back to the network entity 1044 over intermediate network 1040. Note that routing traffic between a resource instance and a network entity 1044 may require network address translation to translate between the public IP address and the local IP address of the resource instance.

Some embodiments may allow a customer to remap public IP addresses in a customer's virtual network 1060 as illustrated in FIG. 10 to devices on the customer's external network 1050. When a packet is received (e.g., from network entity 1044), the network 1000 may determine that the destination IP address indicated by the packet has been remapped to an endpoint on external network 1050 and handle routing of the packet to the respective endpoint, either via private communications channel 1042 or via the intermediate network 1040. Response traffic may be routed from the endpoint to the network entity 1044 through the provider network 1000, or alternatively may be directly routed to the network entity 1044 by the customer network 1050. From the perspective of the network entity 1044, it appears as if the network entity 1044 is communicating with the public IP address of the customer on the provider network 1000. However, the network entity 1044 has actually communicated with the endpoint on customer network 1050.

While FIG. 10 shows network entity 1044 on intermediate network 1040 and external to provider network 1000, a network entity may be an entity on provider network 1000. For example, one of the resource instances provided by provider network 1000 may be a network entity that sends traffic to a public IP address published by the customer.

Figure 11:
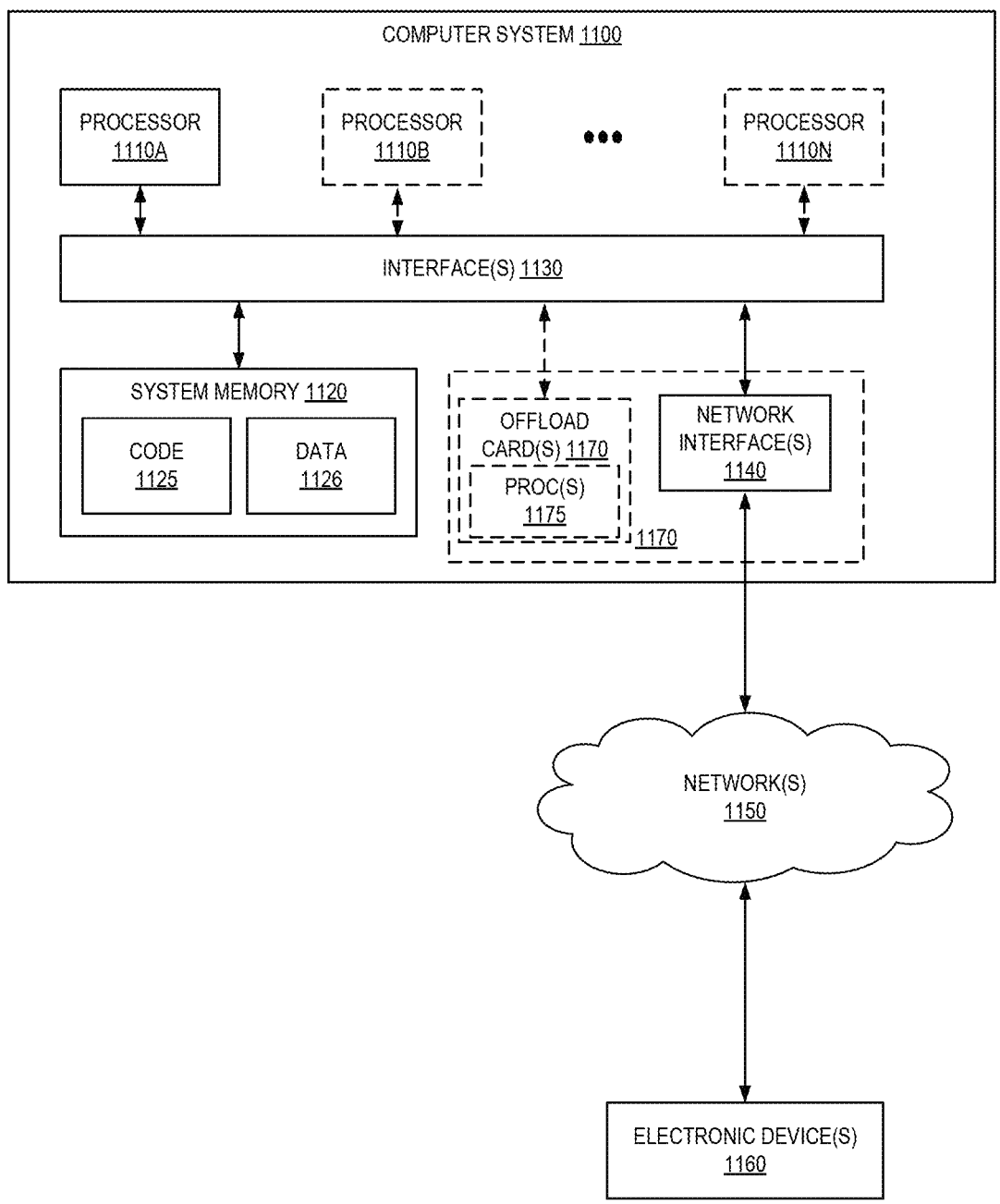
FIG. 11 is a block diagram illustrating an example computer system that may be used in some embodiments.

In some embodiments, a system that implements a portion or all of the techniques for self-supervised single-image 3D reconstruction as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
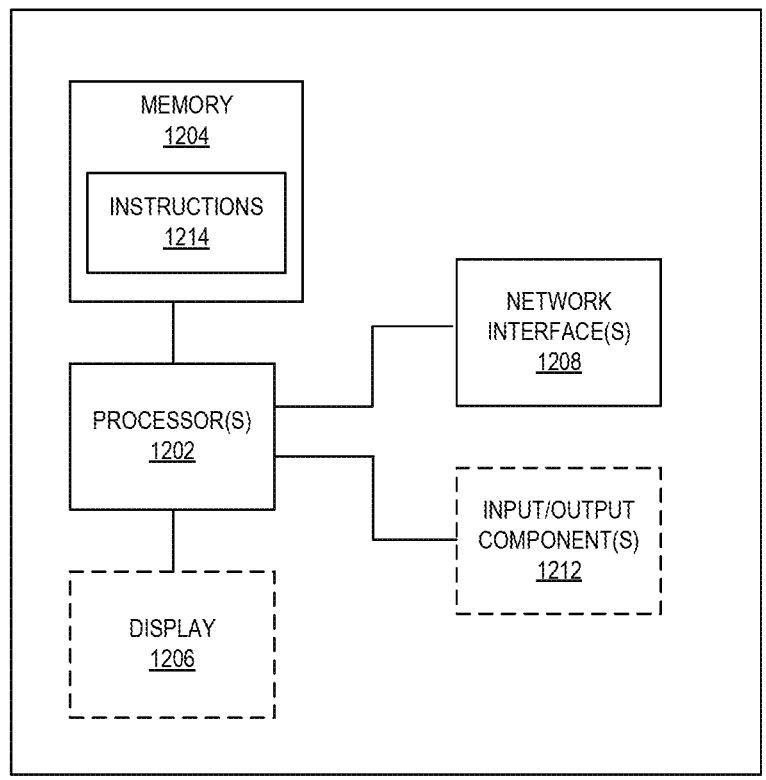
FIG. 12 illustrates a logical arrangement of a set of general components of an exemplary computing device that can be utilized in accordance with various embodiments.

FIG. 12 illustrates a logical arrangement of a set of general components of an example computing device 1200 such as a device or provider network, etc. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (e.g., instructions 1214) and/or data, and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1214) for execution on the set of one or more processors 1202 of that electronic device. One or more parts of various embodiments may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some embodiments include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 13:
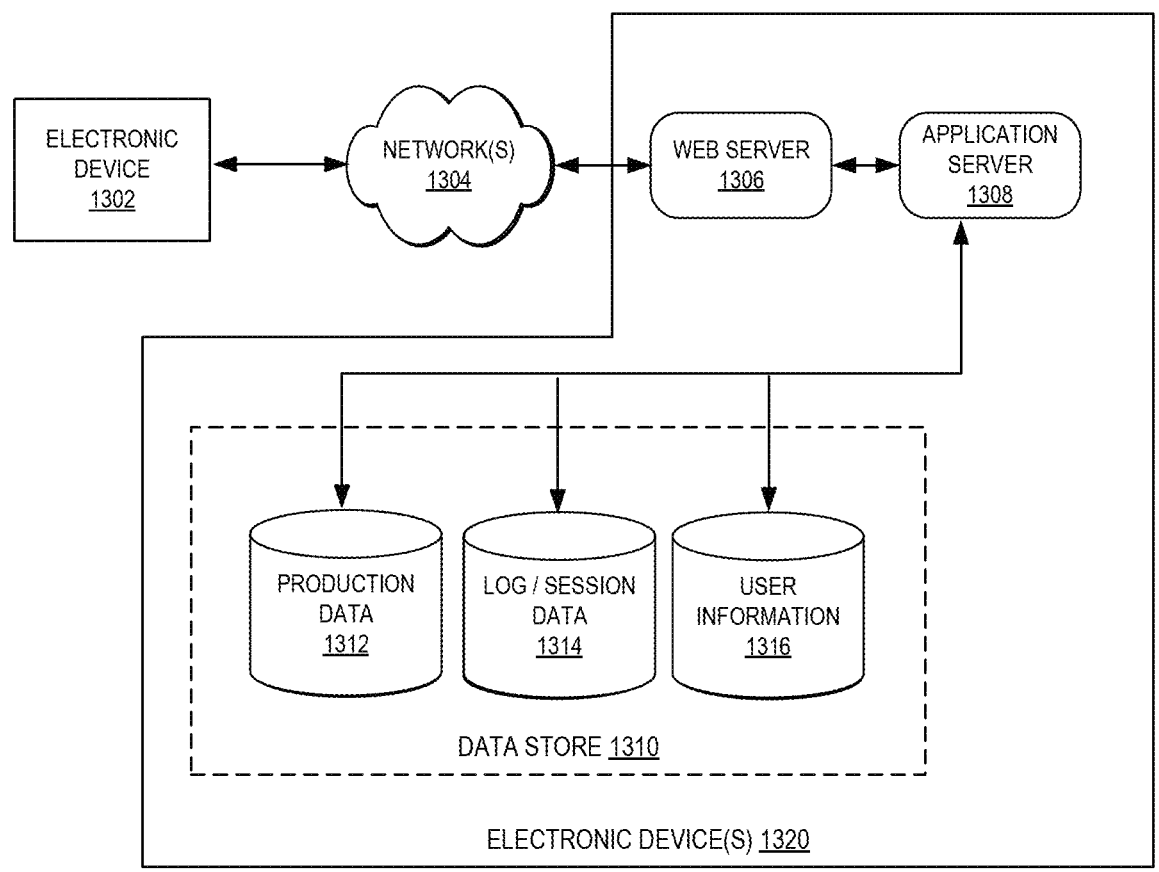
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. For example, in some embodiments requests are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various embodiments. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   generating a 3D facial model by reconstructing a single 2D facial image using a 2D to 3D image reconstruction network machine learning model;
   performing at least two rigid body transformations of the 3D facial model to generate at least two rotated 3D facial models, the at least two rigid body transformations to rotate the 3D facial model about an axis away from a viewing direction of the single 2D facial image;
   rendering the at least two rotated 3D facial models as rendered 2D facial images; and
   retraining the 2D to 3D image reconstruction network machine learning model using corresponding pairs of rotated 3D facial models and rendered 2D facial images.

2. The computer-implemented method of claim 1, wherein the 2D to 3D image reconstruction network machine learning model is a volumetric regression network.

3. The computer-implemented method of claim 1, wherein rendering the at least two rotated 3D facial models as rendered 2D images includes changing illumination of the at least two rotated 3D facial models.

4. A computer-implemented method comprising:
   performing at least two transformations of a 3D model to generate at least two rotated 3D models, the at least two transformations to rotate the 3D model about an axis away from a viewing direction of the single 2D image;
   rendering the at least two rotated 3D models as rendered 2D images; and
   retraining a 2D to 3D image reconstruction network machine learning model using corresponding pairs of rotated 3D models and rendered 2D images.

5. The computer-implemented method of claim 4, wherein the rotations are rigid body transformations.

6. The computer-implemented method of claim 4, wherein the 2D to 3D image reconstruction network machine learning model is a volumetric regression network.

7. The computer-implemented method of claim 4, wherein rendering the at least two rotated 3D facial models as rendered 2D images includes changing illumination of the at least two rotated 3D facial models.

8. The computer-implemented method of claim 4, further comprising:
   altering the 3D model prior to transforming.

9. The computer-implemented method of claim 8, wherein altering the 3D model prior to transforming comprises changing a facial expression.

10. The computer-implemented method of claim 4, further comprising:
    generating a 3D model using the retrained the 2D to 3D image reconstruction network machine learning model.

11. The computer-implemented method of claim 4, wherein performing at least two transformations of the 3D model to generate at least two rotated 3D models comprises rotating away from a bilateral symmetry plane.

12. The computer-implemented method of claim 4, wherein the 3D model includes a mesh and a texture map.

13. The computer-implemented method of claim 4, wherein the 2D to 3D image reconstruction network machine learning model is a 3D Morphable Model.

14. A system comprising:
    a front end implemented by a first one or more electronic devices; and
    a 3D image reconstruction service implemented by a second one or more electronic devices, the 3D image reconstruction service including instructions that upon execution cause the 3D image reconstruction service to:
      receive a request from the front end to retrain a 2D to 3D image reconstruction network machine learning model; and
      in response to the request,
        generate a 3D facial model by reconstructing a single 2D facial image using the 2D to 3D image reconstruction network machine learning model,
        perform at least two transformations of a 3D model to generate at least two rotated 3D models, the at least two transformations to rotate the 3D model about an axis away from a viewing direction of the single 2D image,
        render the at least two rotated 3D models as rendered 2D images, and
        retrain the 2D to 3D image reconstruction network machine learning model using corresponding pairs of rotated 3D models and rendered 2D images.

15. The system of claim 14, wherein the rotations are rigid body transformations.

16. The system of claim 14, wherein the 2D to 3D image reconstruction network machine learning model is a volumetric regression network.

17. The system of claim 14, wherein the 2D to 3D image reconstruction network machine learning model is a 3D Morphable Model.

18. The system of claim 14, wherein to render the at least two rotated 3D facial models as rendered 2D images includes to change illumination of the at least two rotated 3D facial models.

19. The system of claim 14, wherein to perform at least two transformations of the 3D model to generate at least two rotated 3D models comprises rotating away from a bilateral symmetry plan.

20. The system of claim 14, wherein the 3D model includes a mesh and a texture map.

* * * * *